United States Patent [19]

Garvey et al.

[11] Patent Number: 5,078,821
[45] Date of Patent: Jan. 7, 1992

[54] METHOD AND APPARATUS FOR PRODUCING COMPOSITES OF MATERIALS EXHIBITING THERMOPLASTIC PROPERTIES

[75] Inventors: Raymond E. Garvey, Knoxville; Edmund T. Grostick, Faragut, both of Tenn.

[73] Assignee: The United States of America as represented by the United States Department of Energy, Washington, D.C.

[21] Appl. No.: 566,289

[22] Filed: Aug. 13, 1990

[51] Int. Cl.$^5$ .............................................. B32B 31/00
[52] U.S. Cl. .................................... 156/282; 156/494; 156/555; 156/272.2; 29/113.1
[58] Field of Search ............... 156/272.2, 274.2, 380.9, 156/285, 382, 494, 498, 499, 555, 574, 576; 29/113.1

[56] References Cited

U.S. PATENT DOCUMENTS

| | | | |
|---|---|---|---|
| 2,433,094 | 12/1947 | Crowley | 156/382 |
| 4,029,535 | 6/1977 | Cannon | 156/272.8 |
| 4,569,716 | 2/1986 | Pugh | 156/574 |
| 4,903,597 | 2/1990 | Hoage | 29/113.1 |

Primary Examiner—David A. Simmons
Assistant Examiner—Robert Barker
Attorney, Agent, or Firm—Stephen D. Hamel; William R. Moser; Richard E. Constant

[57] ABSTRACT

A mobile device for the complete consolidation of layers of material which exhibit thermoplastic properties for the formation of a composite of the layers upon a complex contoured substrate. The principal of the device is to provide heating into the molten temperature range of the thermoplastic material, applying sufficient pressure to the layers to cause flow of the plastic for a time sufficient to achieve full consolidation of the layers, and quickly cooling the structure to prevent delamination or other non-consolidation action. In the preferred form, there is an element to deposit a layer of the mateiral against another layer in close proximity. The two layers are pre-heated to near the melting temperature, and then further heated into the melting temperature range as they are brought into intimate contact with sufficient pressure to cause flow of the plastic for a time sufficient to achieve the full consolidation. The structure is then cooled. The mechanism for the application of pressure is selected such that the layers can be deformed to conform to a complex contour. In the preferred form, this pressurization is produced using a compliant hood that supplies both the pressure and at least a portion of the melting temperature, as well as the cooling. The apparatus, and method of operation, are described relative to the use of fiber-reinforced PEEK in the making of fully-consolidated composites. Other applications are discussed.

1 Claim, 5 Drawing Sheets

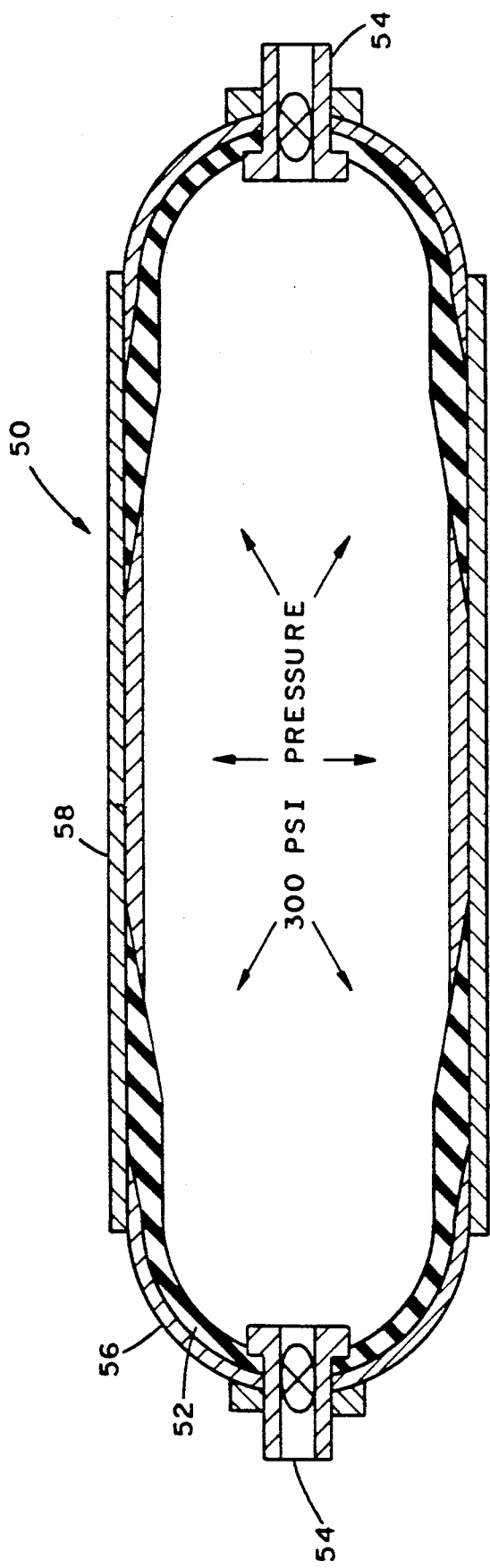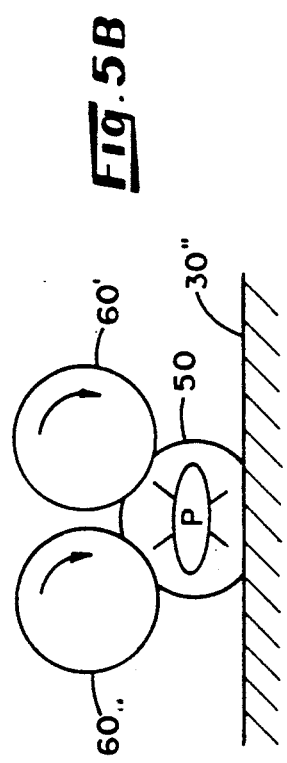

METHOD AND APPARATUS FOR PRODUCING COMPOSITES OF MATERIALS EXHIBITING THERMOPLASTIC PROPERTIES

This invention was made in the course of Contract No. DE-AC05-840R21400 between Martin Marietta Energy System, Inc. and the U.S. Department of Energy.

DESCRIPTION

1. Technical Field

This invention relates to the production of multilayered composites of materials that exhibit thermoplastic properties, and more particularly to a apparatus (and method) that is useful for the production of fully consolidated thermoplastic composites and that does not require an autoclave such that the composites can be produced "on site" if desired. The apparatus provides for the necessary heat and pressure delivered over a sufficient time such that the composites can be produced having a complex contour using a moving head for the consolidation.

2. Background Art

A large number of objects are currently produced from thermoplastic materials, from toys to various types of vehicle components including those for aircraft and spacecraft, for example. While some of these objects require only a single layer of the plastic, many involve multiple layers so as to form a "composite". Often these layers of plastic will include a strengthening material in the form of reinforcing fibers. In the field of spacecraft part fabrication, the plastic is frequently in the form of thin layers of a polyether ether ketone (PEEK) containing carbon fibers, where the fibers are present at about 60% by volume. These layers, typically referred to as a "prepreg", are typically formed using a tape about 0.005 in. thick, and commercially-available tapes of this material having a width of about three inches are available from several sources, including Amoco Chemical Company.

It is common practice for the forming of the composites to place one or more layers of the thermoplastic sheet over a die of the desired configuration. This assembly is placed in a bag, which is evacuated, and then in an autoclave where is it heated (typically about 700°-800 degrees F.) under pressure (typically 100-200 psi) for about one second. Under these conditions the thermoplastic conforms to the shape of the die such that it can be cooled and removed from the autoclave. There is essentially no restriction on the contour of the part.

It can be seen, however, that this typical forming method is limited to parts having a size and shape that can be processed within an autoclave. When larger components are to be produced, or a repair to a previously prepared composite is to be made, other methods are required. Limited success has been achieved for these applications by providing a moving head (or moving a part past a stationary head) where the plastic is locally heated and then immediately subjected to pressure of a roller to achieve consolidation. A schematic drawing of apparatus for accomplishing this is shown in FIG. 1 and discussed further hereinafter. This most often results in what is referred to as partial consolidation (some porosity between layers) which is suitable for some applications but not sufficient for producing high integrity composites. The major problem stems from the limited time at pressure such that "flow" of the thermoplastic is not sufficient to achieve full consolidation.

Various systems have been under development to achieve full consolidation. Limited success has been achieved with only a few of the systems, and these do not achieve full consolidation when a complex surface is involved, or a surface has multiple curvatures.

Accordingly, it is an object of the present invention to provide a method for achieving sufficient flow of thermoplastic materials during the heating thereof such that full consolidation of multiple layers is achieved.

It is another object of the present invention to provide a method and apparatus that will produce fully-consolidated composites of materials that exhibit thermoplastic properties.

Another object of the present invention is to provide an apparatus that can be moved relative to an irregular and/or complex contour surface to form a fully consolidated composite of multiple layers of thermoplastic materials.

These and other objects of the present invention will become apparent upon a consideration of the drawings that follow together with a complete description thereof.

DISCLOSURE OF THE INVENTION

In accordance with the present invention, an apparatus is provided for preparing fully consolidated composites of multiple plies of materials exhibiting thermoplastic properties. Specifically, it is described with regard to the formation of such composites using thin fiber-reinforced plastic sheets. The apparatus is applicable to being moved relative to the structure being formed and provides for the heating of the material to melting temperature, applying sufficient pressure for a time sufficient to cause "flow" of the material, and then cool the product. This apparatus can thus be used to form composites that conform to irregular and complex surfaces.

Although developed specifically for producing composites of fiber-reinforced thermoplastic films, the apparatus and method of operation are applicable to other materials that exhibit thermoplastic properties.

BRIEF DESCRIPTION OF THE DRAWINGS

FIG. 5A is a schematic drawing of another embodiment of the present invention to give full consolidation of composites.

FIG. 5B is a schematic drawing of drive means for rotating the embodiment of FIG. 5A.

BEST MODE FOR CARRYING OUT THE INVENTION

Figure 1:
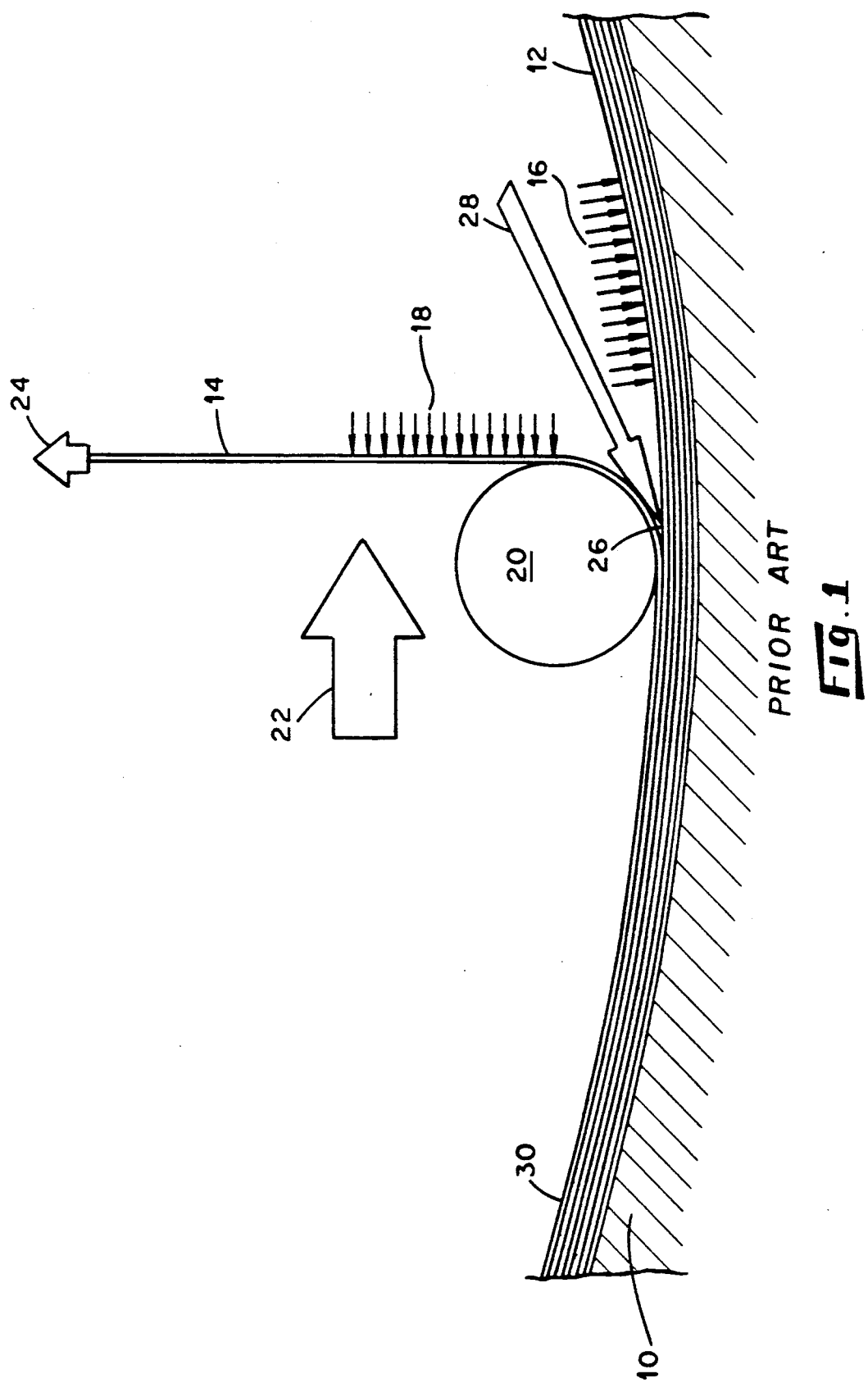
FIG. 1 is a schematic drawing of an embodiment of a consolidation device, which can be considered as prior art, which achieves partial consolidation and is limited to producing composites on regular surfaces, e.g., cones, cylinders and flat plates.

In order to better understand the principles of the present invention, an early embodiment (one type of prior art) of a test device is illustrated schematically in FIG. 1. In this figure, the "die" is represented by a "tool surface" 10 which is considered to be stationary. This illustrates a "substrate" 12 of previously-formed partially consolidated layers of thermoplastic film, with an additional layer to be deposited as from the "tow" 14. It can be seen that both the substrate 12 and the tow 14 are preheated as indicated at 16, 18, respectively, with the temperature being raised to above the crystallinity temperature, $T_c$, but below the melting temperature, $T_m$. Typically this preheat is accomplished by infrared lamps. A roller 20 is caused to move over the substrate in a direction indicated by the arrow 22 to cause the tow to be added to the substrate. During this movement it is desirable that tension be maintained on the tow as indicated by the arrow 24. At about the point of contact of the roller and the tow, referred to as the "nip" 26, additional heat is added to raise the temperature above the melting temperature but below the degradation temperature, $T_d$. This heating to the melting temperature is typically accomplished using laser energy as indicated at 28. Alternately, hot air, microwave energy, or focused infrared radiation can be use for this additional heating. The roller 20 causes flow of the thermoplastic as well as reducing the temperature during the pressure application so as to chill the newly created substrate indicated at 30. Ultimately dozens of layers can be added either as single plies or as multiple plies if desired.

Figure 2:
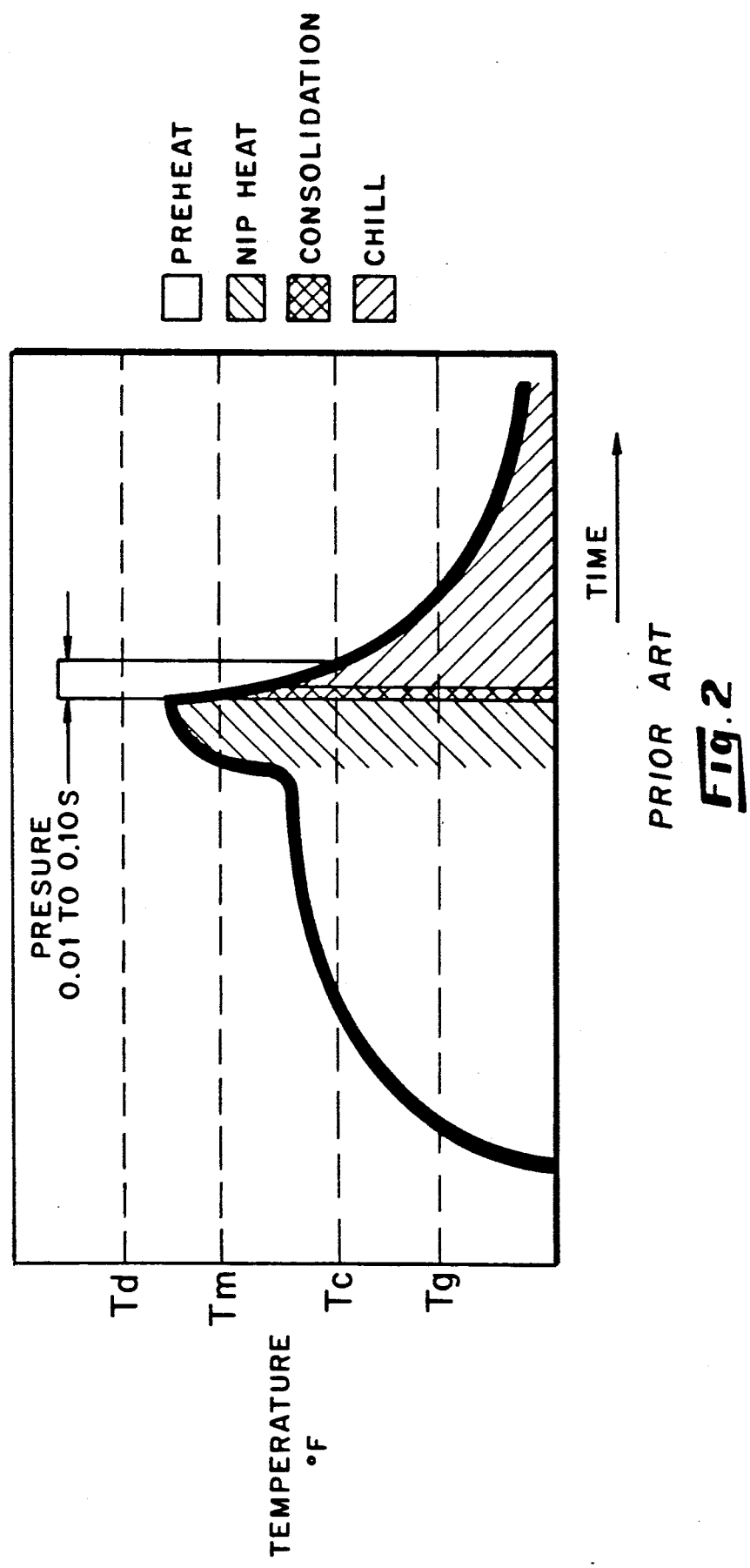
FIG. 2 is a time-temperature plot as achieved with the device of FIG. 1.

The time versus temperature plot for this device is illustrated in FIG. 2. It can be seen that the residence time at pressure-melting temperature is very short due to the line contact between the roller and the new substrate; therefore, only partial consolidation occurs (particularly at high processing rates) before the substrate is cooled sufficiently that no more consolidation can take place. It will be seen, also, that since a roller has only line contact, this structure is only suitable for cones, cylinders and flat plates. Even then, if the materials being consolidated have significant unevenness, some places will receive more compaction pressure than others.

Figure 3:
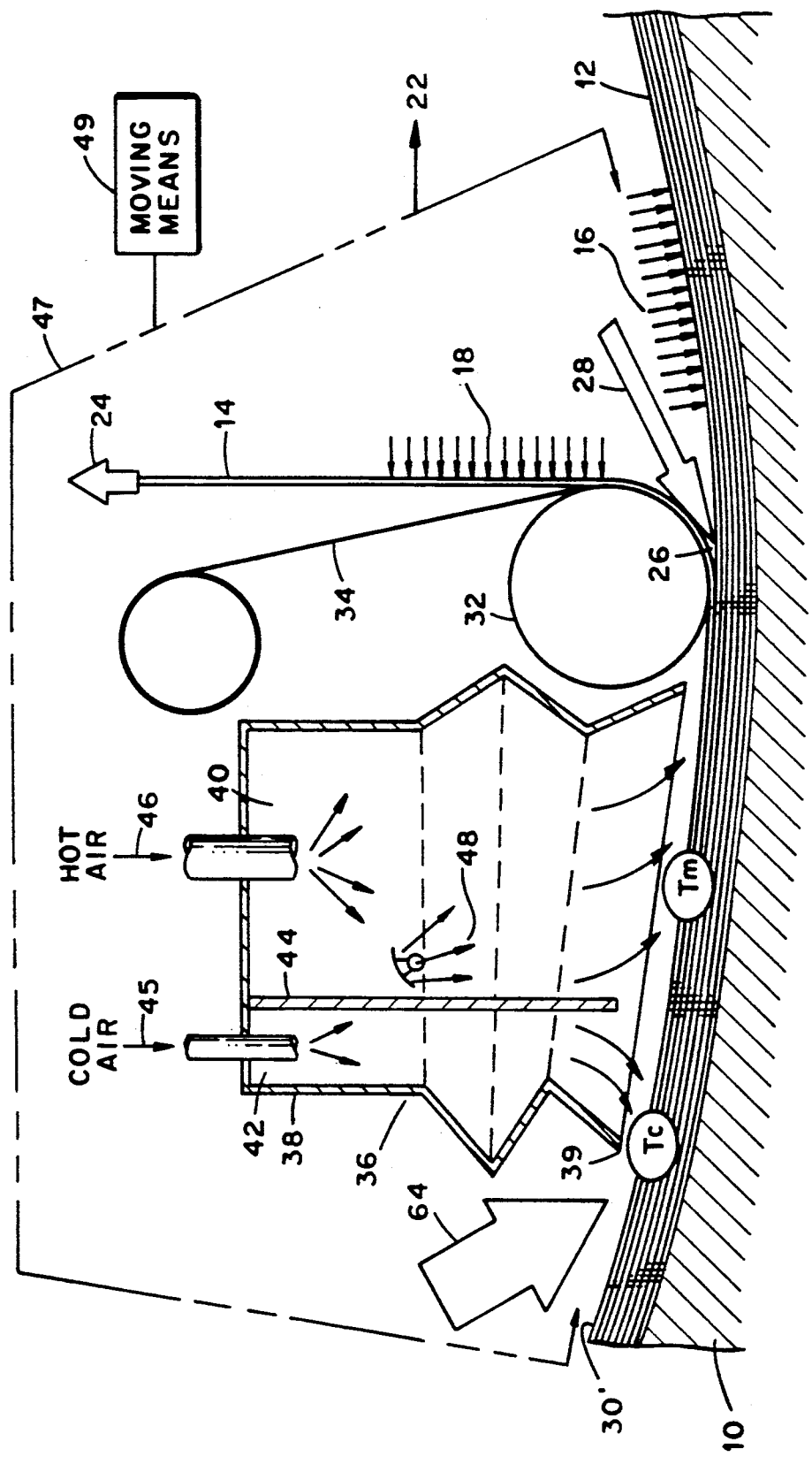
FIG. 3 is a schematic drawing of an embodiment of the present invention that gives rise to full consolidation of composites even upon irregular surfaces and surfaces of complex geometries

Referring now to FIG. 3, shown schematically therein is a preferred embodiment of a device for achieving full consolidation of composites of layers of thermoplastic materials. Those components that are common to the embodiment of FIG. 1 carry the same numbering sequence. Thus, there is a tool surface 10 upon which is indicated an initial substrate 12 of previously applied layers of the thermoplastic material. This substrate 12 and a tow 14 for producing a new layer on the substrate are preheated as at 16, 18. As before, the device moves relative to the substrate in a direction indicated by the arrow 22, and tension is preferably applied to the tow in a direction indicated by the arrow 24. Heat for producing melting temperatures is supplied at the nip 26 by laser energy 28 (or other suitable source).

In this embodiment the roller 32 serves a different function than in the embodiment of FIG. 1; namely, roller 32 is used to position the tow 14 against the original substrate and prevent introduction of air between the layers. It can perform the initial flow of the thermoplastic in the same manner as the roller 20. A similar function can be accomplished with other devices, for example, "doctor blades" (not shown) in contact with the surface so as to align the layer against the prior substrate and exclude air from between the sheets. Further, an optional caul sheet 34 is illustrated as a means of further uniformly distributing pressure over the plastic in a molten state. This caul sheet would be used only when forming a composite having a simple geometry: conical, cylindrical or flat.

The essential departure from the prior art in this embodiment is the provision for substantially extending the time period during which pressure is applied during the heating cycle at melting temperatures. This is accomplished using what is termed an "air bearing" 36 although it is not a bearing in the usual sense since it does not support its weight. Rather, any weight is born by rolling supports (not shown in this Figure). The purpose of this structure 36 is to provide a compliant hood 38, having an open bottom to define a rim 39, in which is established a first compartment 40 and a second compartment 42 separated by a divider 44. The hood is compliant in that it can adjust to the contour of the newly formed composite 30' and provide a reasonable seal against air leakage. Heat and pressure application is achieved in the first compartment. Typically, the pressure created in this compartment is such as to apply about 100 psi to the surface of the new layer supplied by the tow 14. The heat is produced with hot air 46, which also provides the pressure, and/or by other means such as infrared heaters 48. The heat being supplied maintains the plastic in the molten temperature zone such that the pressure provides the needed flow for a time sufficient to achieve full consolidation of the composite. Cold (or ambient) air 45 is fed into the second compartment 42 to chill the new substrate 30' to below the crystallization temperature to prevent any delamination or other faults in the composite. Pressure in this second compartment 42 can be less than that in the first compartment 40, and typically is about 20 psi. It can be seen that with this construction, the composite beneath the hood can have essentially any contour, regular or non-regular. Thus, as this device is moved relative to the substrate, there is very little limitation upon the contour on the part being fabricated. Typically the region of extended heat under pressure is about one inch in the direction of motion and three inches across so as to accommodate the three-inch width of the tow.

In order to achieve the relative movement of the consolidation equipment relative to the tool surface, the coordinating components for the consolidation are shown enclosed in the dashed line 47, which can be considered a frame means. The box 49 indicates a means for the moving of the unit: either the hand of a user or mechanical means. Thus, these components can be moved in unison by hand, or preferably by appropriate gantry-robotic means (not shown). Alternatively, the components can be held stationary and the tool surface moved; or some motion can be imparted to both components by suitable means.

Figure 4:
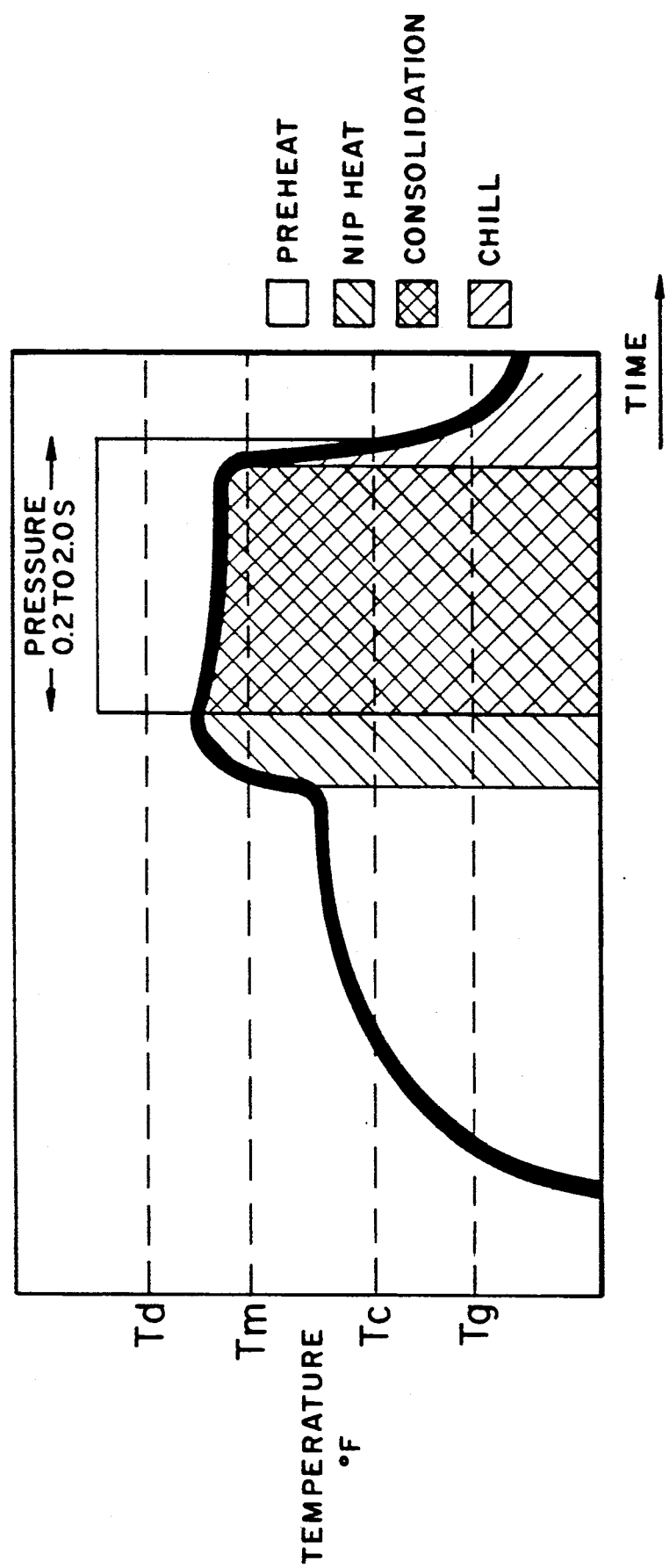
FIG. 4 is a time temperature plot as achieved with the device of FIG. 3 which results in a complete consolidation of a composite structure.

A time-temperature plot is depicted in FIG. 4 as achieved with a device of the type shown in FIG. 3. As in the prior art device, the temperature is gradually raised to near, but below, the melting temperature by the preheaters 16, 18. The temperature is then quickly raised above the melting temperature (but below the destructive temperature) using the laser energy input 28 or a similar source, with the temperature being maintained above the melting point for an extended time by the heating that is created by the first compartment of the hood. By this construction, the pressure upon the composite can be maintained from about 0.2 to about 2 seconds while the plastic is in the molten state. This is in contrast with the 0.01 to 0.1 second achieved with the roller (FIG. 1). After the desired time at pressure and temperature to achieve full consolidation, the plastic is cooled by the air flow into the second compartment of the hood. Substantially higher speeds of processing are thus possible, typically up to 100 inches/sec.

Other embodiments are envisioned that will maintain pressure upon the thermoplastic materials during their molten state for a time sufficient to achieve full consolidation via sufficient plastic flow. One such device is schematically illustrated in FIG. 5A. In this embodiment there is a pressurized tube 50 which serves as the roller of FIG. 1. This tube 50 is compliant in that it provides a continuously moving substantially flat surface that moves over the newly-laid tow to continue holding the required pressure for a sufficient time to achieve full consolidation. The tube 50 typically has an internal bladder 52 for pressurization at, for example, 300 psi. Valves 54 provide for this pressurization. This bladder, in turn, is surrounded by a metallic bladder restraint 56 which exhibits a deformation similar to a fiber-reinforced elastomeric tire and at least partially isolates the bladder from the temperature used to melt the thermoplastic. The outer surface of the tube 50 is a metallic roller 58 to contact the molten layer of thermoplastic material. The metallic outer roller can be a loosely woven metal mesh, a plurality of outwardly-projecting "fingers" or other construction to give at least a limited compliant characteristic. This metallic roller 58 is typically in contact with planetary drive wheels 60, 60' as illustrated in FIG. 5B to produce the rotation of the tube 50 during movement across the newly created substrate 30". While this embodiment achieves a longer time for the pressure-temperature relationship to exist than a non-compliant roller (FIG. 1), structures to be fabricated are generally limited to non-complex contours due to the shape of the tube 50 even when the outer surface has some compliancy.

In another embodiment of a device for achieving an extended time period for the application of pressure while the plastic is in a molten state is similar to that of FIG. 3 except that pressure is applied in a manner similar to a dot matrix printer. Thus, pressure can be applied to the thermoplastic layer even when the substrate has a complex contour.

For the specific reinforced PEEK-type thermoplastics currently of importance to the aerospace program, it has been established that a temperature of about 750°±20 degrees F. is required. When the pressure is about 100 psi, the pressure must be maintained for about one second to achieve full consolidation. The devices depicted in FIGS. 3 and 5A appear to achieve this time duration.

In particular, the device of FIG. 3 will achieve this even at high production rates. Further, the device of FIG. 3 can be used for complex surface contours.

Although the production of composites of thermoplastic materials, and particularly reinforced plastics, has been discussed exclusively, the apparatus and method of operation thereof can be used for other applications. For example, the apparatus without a tow can be used to repair areas there insufficient consolidation has been achieved. Referring again to FIG. 3, apparatus 64 is illustrated adjacent the hood 38 to provide thermal imaging information. Regions that are not sufficiently bonded will display a different temperature pattern. Using the temperature profiles as a guide, the embodiment of the present invention can be passed over the non-bond area until correct bonding is noted.

Other applications of the devices are in thermoplastic welding to achieve a continuous fusion bond with surface resins or added resins for joint fillers. The devices can be used in a manner similar to forming composites for applications of liners or coatings to numerous objects. Even metal sheet stock or metal foil can be used with thermoplastic adhesive for creating complex structures.

Although the present invention can be utilized to accomplish various types of composite formation, the following three utilizations are typical of such use.

EXAMPLE I

The device of FIG. 3 can be utilized to place one or more layers of thermoplastic film, such as carbon fiber reinforced PEEK, upon a structure, such as the exterior of a metallic vessel. The vessel is first coated with a resin exhibiting thermoplastic properties. This becomes the "substrate" of the apparatus. Thereafter, the device is moved across the surface of the resin coating, with a film of the PEEK being fed as the tow. As the film approaches the roller used for placement of the film, the thermoplastic resin and the tow are heated to about 650 degrees F. as a preheat, and then at the nip between the roller and the surface of the resin a laser beam in impinged thereon to raise the temperature to about 720°-780 degrees F. This heated region then passes under the hood where a temperature of this same magnitude exists in the first chamber together with a pressure of about 100 to 200 psi. The time duration under this first chamber is about one second during which adequate flow of the thermoplastic materials occurs such that, upon cooling while passing under the second chamber of the hood, the bond is fully consolidated. Since the typical width of the commercially-available film is about 3 inches, further passes of the device are required to cover the surface of the vessel, with each pass slightly overlapping the previous pass. In addition, a plurality of layers can be formed by repeating the process. Due to the manner of applying the pressure over an area defined by the first chamber, the vessel can have most any contour and the covering will conform to that contour.

EXAMPLE II

The device of FIG. 3 can be used to place an additional layer of the thermoplastic film upon multiple layers that already exist (the substrate). For this application, no resin is required. The device is passed over the surface in a manner described above, with both the substrate and tow being preheated to just below the melting temperature. Through use of the laser energy, the temperature is raised locally to above the melting point (typically between 700° and 800 degrees F.), with this portion then moving under the hood where the temperature is retained for about one second and a pressure of 100 to 200 psi is applied. Then, as the resultant new substrate passes under the second chamber of the hood, it is cooled and a fully consolidated juncture results. Again, due to the nature of the manner of applying pressure with the hood, the surface of the original substrate can have many regular or irregular contours and the new layer will conform to that contour.

EXAMPLE III

In either of the above Examples, or due to applications of thermoplastic layers by other processes, there may be areas of non-bond indicating a lack of full consolidation. In these cases, the apparatus of FIG. 3 can be used to achieve full consolidation. For this use, no new tow is added during the movement of the device across the surface of the substrate. However, the preheat and then the full heating (at the melting temperature of the particular thermoplastic) under pressure is utilized to achieve full flow of the thermoplastic and therefore achieve full consolidation of the layers when cooled. The movement can be either across the contours of the non-bond area, or along such contours. Due to the manner of applying the pressure via the hood, the substrate can take on many contours not only regular but also irregular.

From the foregoing, it will be understood by persons skilled in the art that an improved device and method have been developed whereby heat and pressure can be maintained for a time sufficient to achieve complete consolidation with materials that exhibit thermoplastic properties. This is of particular value in the formation of composites produced using a plurality of layers of thermoplastic materials, including fiber-reinforced thermoplastics. While certain details are given as to temperature and pressure, for example, these are not given to limit the invention. Rather, the invention is to be limited only by the appended claims or their equivalents when read with the entire description of the invention.

We claim:

1. A mobile device for the complete consolidation of layers of material which exhibit thermoplastic properties to form a fully consolidated juncture of said layers upon selected regular and irregular contours selected from conical surfaces, cylindrical surfaces and flat surfaces, which comprises:

support means to support one of said layers, said support means having said selected contour;

frame means;

first heating means associated with said frame means to preheat said layers to a temperature above a crystallinity temperature but below a melting temperature of said layers of material to be joined;

further heating means associated with said frame means to heat said preheated layers to a temperature above said melting temperature but below a destructive temperature for said layers of material to be joined;

pressure means associated with said frame means in proximity of said further heating means for applying pressure over an extended area to a second of said layers to press said second of said layers against said layer supported in said support means as said frame means is moved relative to said support means, said pressure means applying surface pressure to said second of said layers for a time sufficient to cause flow of molten thermoplastic material to ensure full consolidation between said layers; said pressure means comprising:

a compliant roller having a deformable surface to achieve an extended contact with said second layer, said compliant roller comprising:

a central compliant bladder means, said bladder means being provided with means for internal pressurization;

a compliant bladder restraint means surrounding said bladder means; and a compliant surface means surrounding said bladder restraint means for contact with said second layer; and means for causing said compliant roller to resolve about an axis and maintain a position proximate said further heating means to produce said surface pressure against said second layer while said second layer is above said melting temperature; and means for cooling said layers after pressing by such pressure means to achieve complete consolidation thereof.

* * * * *